United States Patent [19]
Okude et al.

[11] Patent Number: 6,157,342
[45] Date of Patent: Dec. 5, 2000

[54] NAVIGATION DEVICE

[75] Inventors: Mariko Okude, Hitachi; Yoshinori Endo, Mito; Kozo Nakamura, Hitachioota, all of Japan

[73] Assignee: Xanavi Informatics Corporation, Japan

[21] Appl. No.: 09/084,302

[22] Filed: May 26, 1998

[30] Foreign Application Priority Data

May 27, 1997 [JP] Japan ..................................... 9-136669

[51] Int. Cl.[7] ..................................................... G01S 5/02
[52] U.S. Cl. ..................... 342/357.13; 701/208; 340/995
[58] Field of Search .............................. 342/357.13, 180; 701/208; 340/990, 995

[56] References Cited

U.S. PATENT DOCUMENTS

| | | |
|---|---|---|
| 4,812,845 | 3/1989 | Yamada et al. .......................... 340/995 |
| 4,939,663 | 7/1990 | Baird et al. . | |
| 5,483,456 | 1/1996 | Kuwahara et al. . | |
| 5,574,649 | 11/1996 | Levy . | |
| 5,826,212 | 10/1998 | Nagai ....................................... 701/208 |
| 5,913,918 | 6/1999 | Nakano et al. .......................... 701/208 |

FOREIGN PATENT DOCUMENTS

| | | |
|---|---|---|
| 0 534 892 A1 | 3/1993 | European Pat. Off. . |
| 0749 103 A1 | 12/1996 | European Pat. Off. . |
| 3439000 A1 | 4/1986 | Germany . |

*Primary Examiner*—Theodore M. Blum
*Attorney, Agent, or Firm*—Pennie & Edmonds LLP

[57] ABSTRACT

To display a current position of a vehicle along a road in a stereoscopic map drawn based on three-dimensional map data, a navigation device forms a picture image superposing the current position of the vehicle on a perspective map viewing a three-dimensional ground surface from a direction forming a predetermined angle with respect thereto based on data read from a map data base and displays the image on a screen of a display and a position correcting unit 52 calculates an altitude at a position in the map in correspondence with the current position of the vehicle based on altitude data read from the map data base.

12 Claims, 16 Drawing Sheets

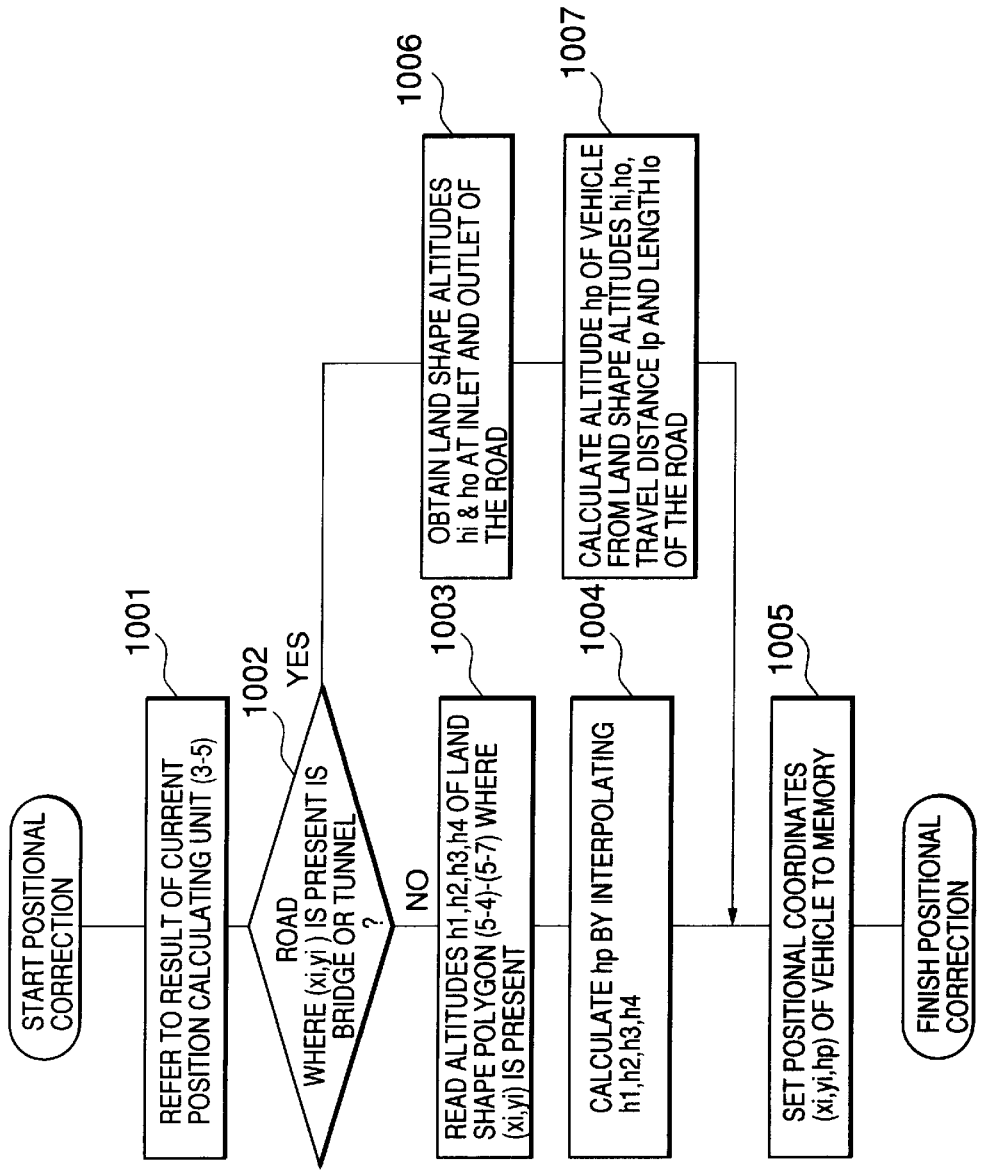

NAVIGATION DEVICE

BACKGROUND OF THE INVENTION

1. Field of the Invention

The present invention relates to a navigation device for displaying a current position of a vehicle, and particularly to a navigation device for displaying a current position of a vehicle by being superposed on a map which is stereoscopically displayed.

2. Description of Related Art

Conventionally, there has been known a navigation device for facilitating driving of an automobile. According to the navigation device, digital map data recorded in a record medium such as CD-ROM or the like is read, a map is displayed on a screen of a display device such as a liquid crystal display or the like and the current position of a vehicle (position of a driving car) that is detected by a position measuring system of a GPS (Global Positioning System) receiving device or the like is overlappingly displayed. Further, a route from the current position to a target location is displayed and the vehicle is guided along that route.

According to a such a navigation device, it is normal to display a planar map (two-dimensional map) on a screen. However, there also is a navigation device for displaying a quasi three-dimensional map to further promote visibility. The method of displaying a quasi three-dimensional map is referred to as "quasi three-dimensional display" in which a perspective view (bird's eye view), that is obtained when a driving vehicle is viewed from an observing point set at a predetermined position in the sky above the driving vehicle in a direction forming an acute angle with respect of the ground, is formed based on map data representing a two-dimensional map and a perspective view is displayed in a display device. In this way, depth perception is given to an operator.

Meanwhile, in displaying the position of a driving vehicle on a screen, there is a case where processing referred to as map matching is also used. Map matching is processing for correcting the position of a driving vehicle detected by a position measuring system based on road coordinates obtained from map data read from a record medium. By also using the map matching, extreme departure of the position of a driving vehicle from a road displayed on a screen can be prevented.

SUMMARY OF THE INVENTION

According to the conventional navigation device, a map is displayed on the screen of the displaying device based on two-dimensional map data. Therefore, even in the case where the "quasi three-dimensional display" explained above is used, a multilevel intersection, a slope, a building or the like is displayed planarly (two-dimensionally). Therefore, there are cases where a situation in the vicinity of a driving vehicle, the vicinity of a target position or the like is difficult to grasp.

Hence, in recent years, there has been an increasing demand for a navigation device for displaying a stereoscopic map based on three-dimensional map data, in order to further facilitate grasping a situation in the vicinity of a position of a driving vehicle, the vicinity of a target position or the like, which cannot be expressed two-dimensionally.

However, when a stereoscopic map is displayed, a problem can be anticipated in which even when the map matching explained above is also used, abnormal display may occur, for example, such that the position of a driving vehicle is disposed in the air above a road. This is due to the fact that the altitude data of the driving vehicle from the position measuring system is used in display processing with a detection error as it is.

Hence, it is an object of the present invention to be able to display the position of a driving vehicle along a road stereoscopically drawn even when the position measuring accuracy in the height direction is low when a stereoscopic map is displayed based on three-dimensional map information with respect to land form, roads and so on.

In order to achieve the above-described object, according to an aspect of the present invention, there is provided a navigation device for displaying a current position of a vehicle on a screen of a display device by superposing the current position on a map, the navigation device including position measuring means for measuring the current position of the vehicle, reading means for reading map data from a map data base storing the map data including altitude data indicating altitudes at a plurality of positions, displaying means for forming a perspective map provided by viewing a three-dimensional ground surface constituted based on the map data read by the reading means from a direction forming a predetermined angle with respect to the ground surface and displaying the current position of the vehicle on the screen of the display device by superposing the current position on the perspective map, and position correcting means for calculating an altitude at the current position of the vehicle based on an altitude data at the current position of the vehicle or at a vicinity thereof in the map data and determining the altitude of the current position of the vehicle displayed overlappingly on the perspective map.

According to the present invention, the altitude at the current position of the vehicle is calculated based on the altitude data in the map data and accordingly, the current position of the vehicle can be displayed so as to be disposed along the ground surface in the perspective map regardless of the position measuring accuracy of the vehicle.

Further, according to another aspect of the present invention, the position correcting means may execute map matching of the current position of the vehicle measured by the position measuring means by using road data in the map data and may calculate an altitude with respect to the current position of the vehicle corrected by the map matching from the altitude data. In this way, the current position of the vehicle can be appropriately arranged along the road.

Further, according to another aspect of the present invention, the navigation device may include a grade sensor for detecting an inclination of the vehicle with respect to a horizontal surface and a traveling amount sensor for detecting a traveling amount of the vehicle. In this case, it is preferable that the position correcting means calculates the altitude at the current position of the vehicle from the altitude data when the vehicle is stationary and calculates the altitude of the current position of the vehicle based on the traveling amount of the vehicle in a vertical direction provided by the grade sensor and the traveling amount sensor when the vehicle is traveling.

Further, according to another aspect of the present invention, the map data may comprise data of respective mesh areas partitioned in meshes by longitudinal lines and latitudinal lines. In this case, when a display area to be displayed on the screen of the display device includes a plurality of the mesh areas and the altitude data is not included in data of any one of the mesh areas, the displaying means may form a two-dimensional map in place of the perspective map and display a two-dimensional current position of the vehicle on the map by superposing the current position on the map.

Further, according to another aspect of the present invention, the displaying means may display a map in accordance with any of a first mode for displaying a two-dimensional map by using only information with respect to longitudes and latitudes of the map data, a second mode for displaying a perspective map (quasi three-dimensional map) provided by viewing the two-dimensional map from a direction of making a predetermined angle with respect to the two-dimensional map and a third mode for displaying a perspective map (three-dimensional map) provided by viewing a three-dimensional ground surface from a direction forming a predetermined angle with respect to the ground surface by using information of the longitudes, the latitudes and the altitude data of the map data. In this case, it is preferable that the position correcting means sets the altitude at the current position of the vehicle at 0 meter above the sea level when the second mode is selected and calculates the altitude at the current position of the vehicle from the altitude data when the third mode is selected.

Further, according to another aspect of the present invention, the position correcting means may determine the altitude at the current position of the vehicle when a road where the current position of the vehicle is disposed is not positioned along the ground surface, based on an altitude of at least one of a start point and an end point of a section of the road which is not disposed along the ground surface. For example, the altitude at the current position of the vehicle may be calculated based on the altitudes at the start point and the end point and a traveling distance from the start point to the current position of the vehicle. Alternatively, the altitude at the current position of the vehicle may be maintained at the altitude at either of the start point and the end point.

In this way, even when the current position of the vehicle is on a bridge, in a tunnel, or on an elevated line or the like, the current position of the vehicle can be displayed along the road. Further, when road height data of a road where the vehicle current positioned is included in the map data, the altitude at the current position of the vehicle may be calculated based on road height data of the road. The road height data is preferably an offset value from the ground surface of the road.

Further, in the present invention, a mark indicating a vehicle displayed on the screen of the displaying device may be changed in accordance with a change in the altitude at the current position of the vehicle provided by the position correcting means. Further, the altitude at the current position of the vehicle provided by the position correcting means may be displayed on the screen of the displaying device.

BRIEF DESCRIPTION OF THE DRAWINGS

FIG. 10 is a flowchart showing processing executed by a position correcting unit according to a third embodiment of the present invention;

DETAILED DESCRIPTION OF THE PREFERRED EMBODIMENTS

An explanation will be given of embodiments of the present invention with reference to the attached drawings.

First, an explanation will be given of a first embodiment of the present invention.

Figure 1:
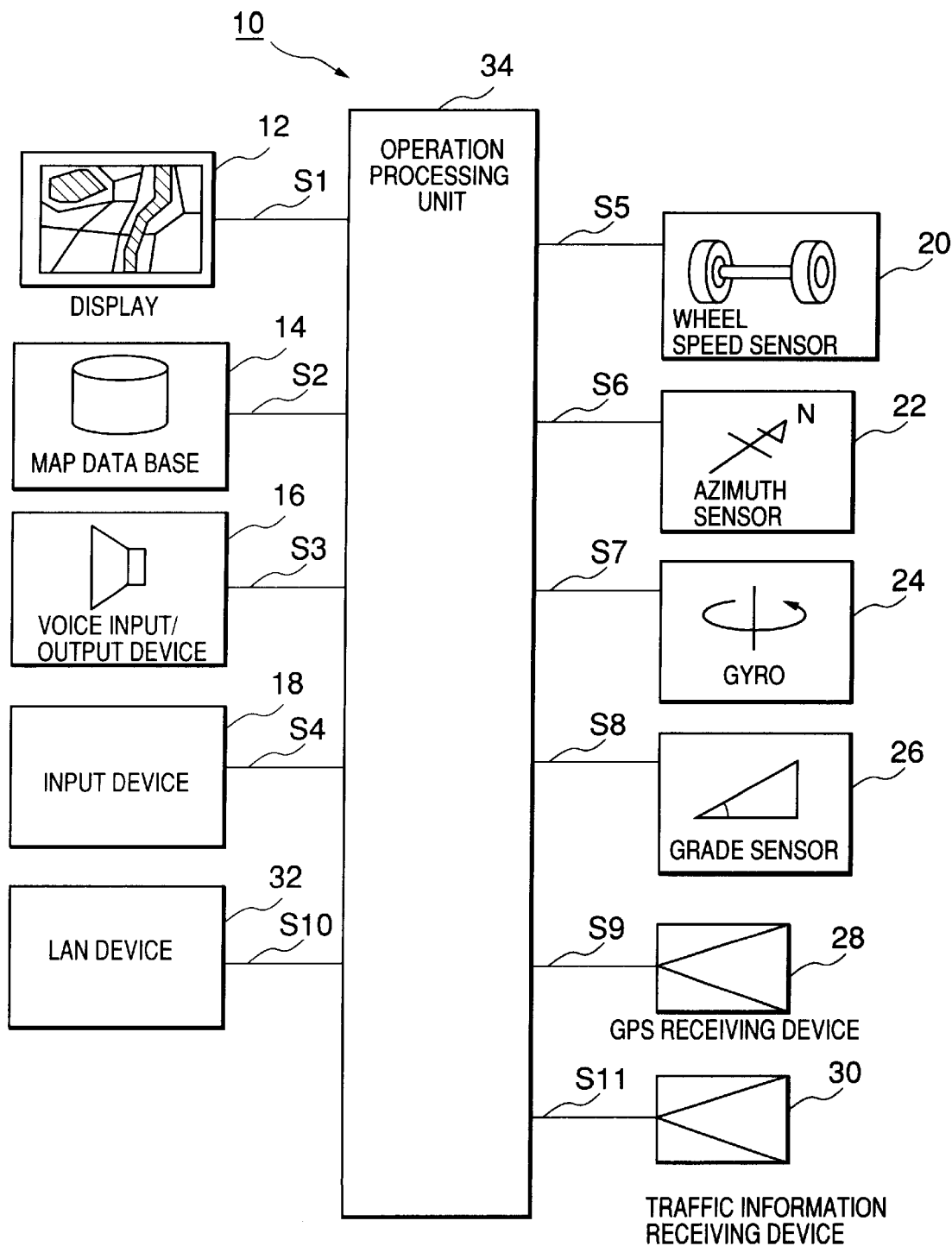
FIG. 1 is a block diagram showing a constitution of a navigation device according to a first embodiment of the present invention.

FIG. 1 is a block diagram showing a constitution of a navigation device according to the first embodiment of the present invention.

As shown by FIG. 1, a navigation device 10 includes a display device 12 comprising a CRT or a liquid crystal display, a device for reading map data from a map data base 14 comprising a record medium of CD-ROM, DVD (Digital Video Disk), an IC card or the like, a voice input and output device 16 for converting a given signal into a voice signal and outputting the voice signal, recognizing voice uttered by a user and forming a signal based thereon, an input device 18 constituted by hard switches of a scroll key, a contraction scale change key and the like, a joy stick and a touch panel arranged on a screen of the display device 12, a wheel speed sensor 20 for measuring a number of rotations of a wheel and measuring a travel distance of a vehicle based on a product of the rotational number by a circumference of wheel, an azimuth sensor 22 for detecting an orientation of the vehicle (vehicle direction) by detecting a magnetic field of the earth, an angle gyro 24 such as an optical fiber gyro, an oscillation gyro or the like, a grade sensor 26 for detecting an angle of inclination in a height direction (direction orthogonal to ground surface) of the vehicle, a GPS receiving device 28 for measuring a current position, a traveling direction and a traveling orientation of the vehicle by receiving signals from three or more of GPS (Global Positioning System) satellites and measuring distances between the vehicle and the respective GPS satellites and rates of change of the distances, a traffic information receiving device 30 for receiving traffic information of information of road traffic congestion, traffic control information such as an under road construction state, traffic closure or the like, or information about parking lots and so on transmitted from beacon transmitters or FM multiplex broadcast stations and a vehicular LAN (Local Area Network) device 32 for communicating various information about the vehicle.

Map data stored in the map data base 14 includes road data. The road data includes node data indicating coordinates of positions in correspondence with intersections of roads and link data indicating links for connecting nodes.

The respective constituent parts of the navigation device explained above are connected to an operation processing unit 34. The operation processing unit 34 calculates a current position of the vehicle based on data outputted from the various sensors (20 through 26) in accordance with programs stored in ROM (refer to numeral 42 of FIG. 2) and the like. Further, the operation processing unit 34 reads necessary map data from the map data base 14 based on the calculated information with respect to the current position, forms a picture image in correspondence with the read map data, superposes a current position mark indicating the current position of the vehicle on the formed picture image and outputs them to the display device 12.

Further, the operation processing unit 34 calculates optimum route connecting positions (for example, current position and target position) instructed by the user via the input device 18 and outputs the route to the display device 12 or carries out processing for guiding the vehicle along the route by voice via the voice input and output device 16.

Further, according to the embodiment, as a signal S1 transmitted between the operation processing unit 34 and the display device 12, an RGB signal or an NTSC (National Television System Committee) signal is used.

Next, a detailed explanation will be given of the operation processing unit 34 among the respective constituent parts of the navigation device shown by FIG. 1.

Figure 2:
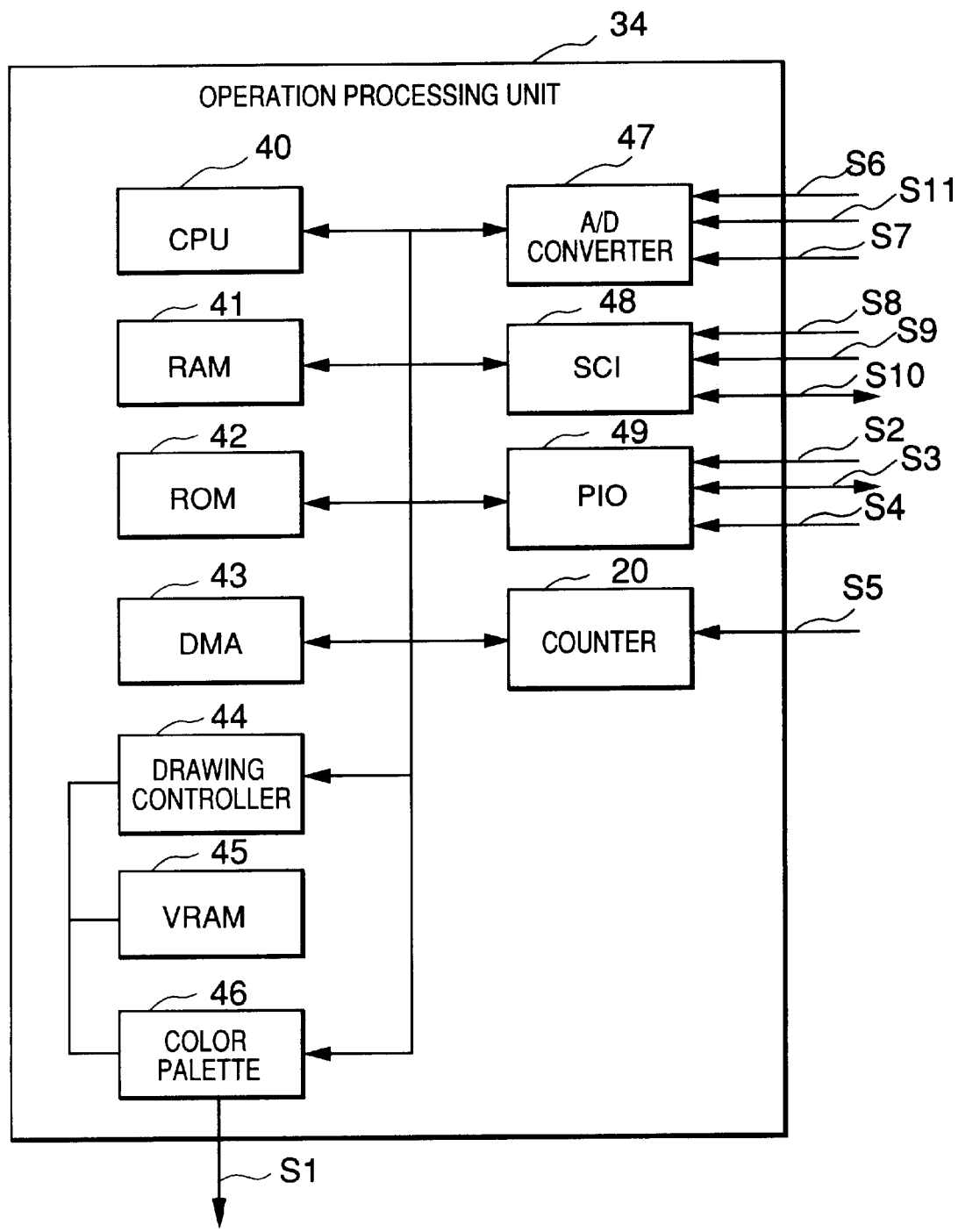
FIG. 2 is a block diagram showing a hardware constitution of an operation processing unit according to the first embodiment of the present invention.

FIG. 2 is a block diagram showing a hardware constitution of the operation processing unit 34.

As shown in FIG. 2, the operation processing unit 34 includes CPU 40 for controlling numerical calculation and respective devices described below, RAM 41 for temporarily storing map data or data obtained by calculation, ROM 42 for storing programs executed by CPU 40 and data necessary for executing the programs, DMA (Direct Memory Access) 43 for executing high speed data transmission among memories and between the memories and the respective devices, a drawing controller 44 for executing graphics drawing such as developing vector data into pixel data or the like and executing display control, VRAM 45 for temporarily storing graphics image data, a color palette 46 for converting image data into an RGB data, an A/D (Analog to Digital) converter 47 for converting analog signals into digital signals, a serial parallel converter (SCI) 48 for converting serial signals into parallel signals in synchronism with a bus, PIO 49 for putting signals on the bus in synchronism with the parallel signals and a counter 50 for integrating pulse signals.

Figure 3:
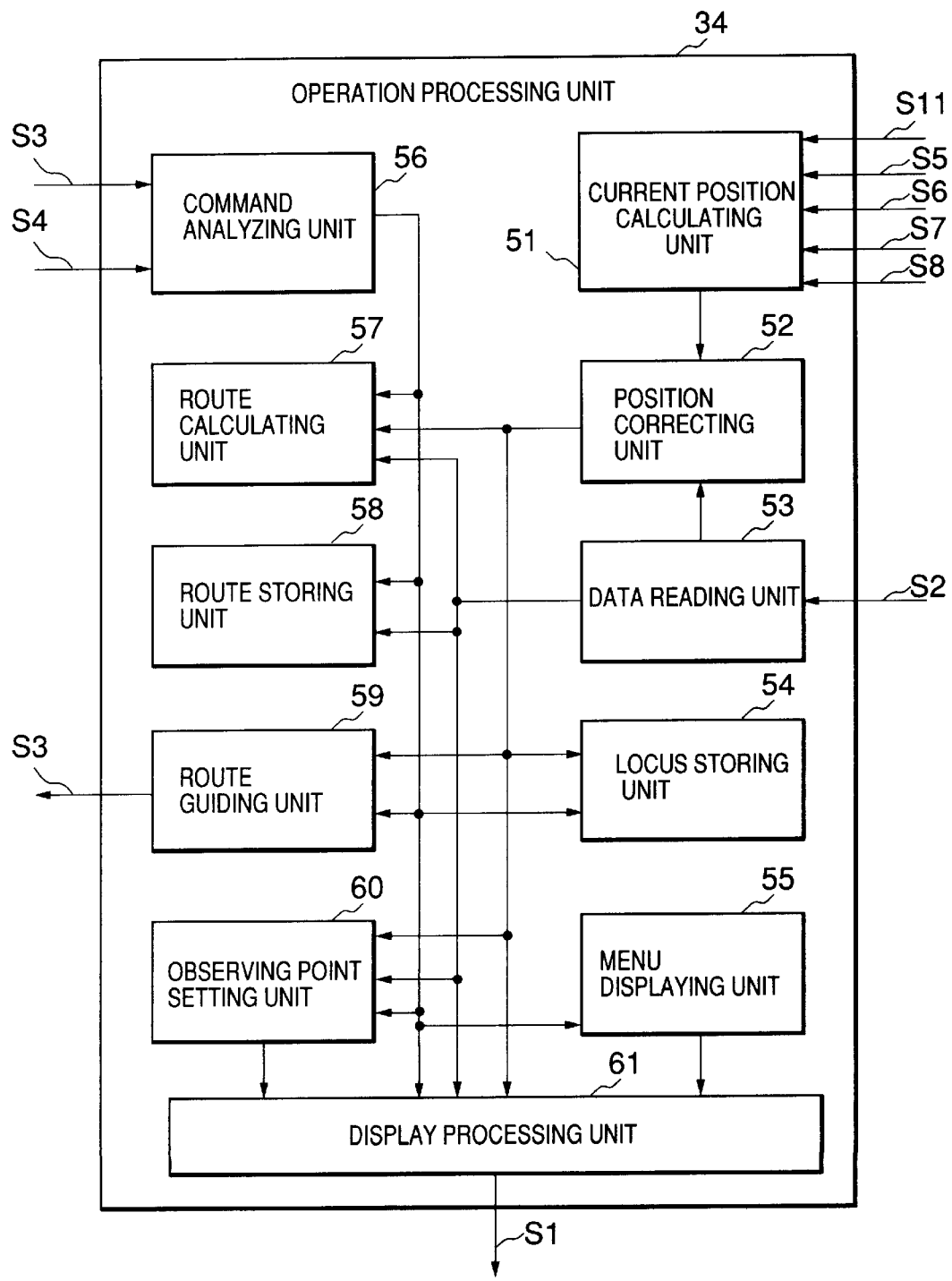
FIG. 3 is a block diagram functionally illustrating the operation processing unit according to the first embodiment of the present invention.

FIG. 3 shows a functional block diagram functionally illustrating the operation processing unit 34 constituted by these devices.

As shown in FIG. 3, the operation processing unit 34 is functionally constituted by a current position calculating unit 51, a position correcting unit 52, a data reading unit 53, a locus storing unit 54, a menu display unit 55, a command analyzing unit 56, a route calculating unit 57, a route storing unit 58, a route guiding unit 59, an observing point setting unit 60 and a display processing unit 61.

The function of the current position calculating unit 51 is realized by CPU 40, the A/D converter 47, SCI 48 and the like in FIG. 2. The current position calculating unit 51 calculates distance data and angle data by respectively integrating a distance pulse data S5 obtained from the wheel speed sensor 20 and angular acceleration data S7 obtained from the gyro 24. Further, the present position calculating unit 51 calculates a position (X', Y') after the vehicle has traveled from an initial position (X, Y) by time-sequentially integrating the calculated distance data and angle data.

Further, the current position calculating unit 51 corrects an absolute orientation of a traveling direction of the vehicle by using orientation data S6 obtained from the orientation sensor 22 and the angle data produced by integrating the angular acceleration data S7 obtained from the gyro 24. Further, when the data obtained from the sensors mentioned above are integrated, error of the sensors is accumulated and therefore, the current position calculating unit 51 executes, at a time cycle, processing for canceling the accumulated error based on position data S8 obtained from the GPS receiving device 28.

The position correcting unit 52 is realized mainly by CPU 40 in FIG. 2. The position correcting unit 52 promotes positional accuracy by correcting the error of the sensors included in the current position of the vehicle calculated by the current position calculating unit 51. The position correcting unit 52 outputs a vehicle position in three dimensions (three-dimensional vehicle position) by executing the altitude correction with respect to the current position of the vehicle mentioned below. Further, the position correcting unit 52 carries out conventional two-dimensional map matching in the case of outputting a vehicle position on a planar map (two-dimensional vehicle position).

In this case, using the data reading unit 53 realized by PIO 49 in FIG. 2, the map matching is realized by comparing roads included in a map at the surrounding of the current position of the vehicle read from the map data base 14 with the traveling locus of the vehicle obtained from the current position calculating unit 51 and matching the current position of the vehicle to a road having the highest correlation with respect to shape. When the vehicle position is displayed to be superposed on the planar map, the calculated current position of the vehicle can be made to coincide with a road on which the vehicle actually travels by the map matching.

The current position data outputted from the position correcting unit 52 is stored to the locus storing unit 54 at every predetermined distance of vehicle traveling. The function of the locus storing unit 54 is realized mainly by RAM 41, DMA 43 and the like in FIG. 2. Locus data indicating the traveling locus of the vehicle is used for drawing a locus mark on a corresponding road on the map with respect to the road on which the vehicle has traveled.

The command analyzing unit 56 analyzes a request of the user received by the input device 18 and controls the respective units such that corresponding processing is executed. The function of the command analyzing unit 56 is realized mainly by CPU 40, PIO 49, ROM 42 and the like in FIG. 2.

For example, when the user requests guidance along a route to a target position, the command analyzing unit 56 instructs the display processing unit 61 to carry out processing of displaying a map including the current position of the vehicle and the target position and instructs the route calculating unit 57 to carry out processing of calculating a route from the current position of the vehicle to the target position.

The route calculating unit 57 searches the route between the instructed positions based on the map data by using the Dykestra Method or the like and stores data with respect to a calculated route in the route storing unit 58. The data with respect to the route comprises data indicating nodes and links constituting the route. Further, according to the Dykestra Method, a route having the shortest distance between the instructed positions, a route capable of reaching the target position in the shortest time period, a route having the least cost and the like can be calculated.

The function of the route guiding unit 59 is realized mainly by CPU 40, PIO 49 and the like in FIG. 2. The route guiding unit 59 compares link data of a guided route stored in the route storing unit 58 with the current position data of the vehicle outputted from the position correcting unit 52, determines whether the vehicle is to go straight or turn right or left before the vehicle reaches an intersection (which corresponds to a node in data), forms voice data based on the determination and outputs the voice data to the voice input and output device 16. Alternatively, the route guiding unit 59 informs the route to the user by indicating a direction in which the vehicle is to travel on the map displayed on the screen via the display processing unit 61 on the basis of the determination.

The data reading unit 53 reads map data requested by various constituent units from the map data base 14. The function of the observing point setting unit 60 is realized mainly by CPU 40. As mentioned below, the observing point setting unit 60 determines an observing point, a line of sight and an angle of field of view for three-dimensional display or quasi three-dimensional display.

The function of the display processing unit 61 is realized mainly by the drawing controller 44, VRAM 45 and the color palette 46 in FIG. 2. The display processing unit 61 reads map data in the vicinity of a position to be displayed on the screen of the display 12 from the map data base 14 via the data reading unit 53, subjects a map constituted by the map data to graphic development based on the observing point, the line of sight and the angle of field of view instructed by the observing point setting unit 60 and contraction scale, drawing method and drawing orientation instructed by the command analyzing unit 56 and stores picture image data temporarily in VRAM 45. The picture image data held temporarily in VRAM 45 is added with color by the color palette 46 and is transmitted to the display 12. Thereby, a desired map is displayed on the screen of the display 12.

The menu displaying unit 55 transmits various kinds of requested menus or marks to the display processing unit 61 in accordance with instructions outputted from the command analyzing unit 56. Thereby, a map superposed with desired menus or marks is displayed on the screen of the display 12.

Next, a detailed explanation will be given of processing carried out by the position correcting unit 52 among the respective functional constitutions of the operation processing unit 34 shown by FIG. 3.

First, prior to the explanation of the processing, an explanation will be given of data constitution of map data stored in the map data base 14.

Figure 4:
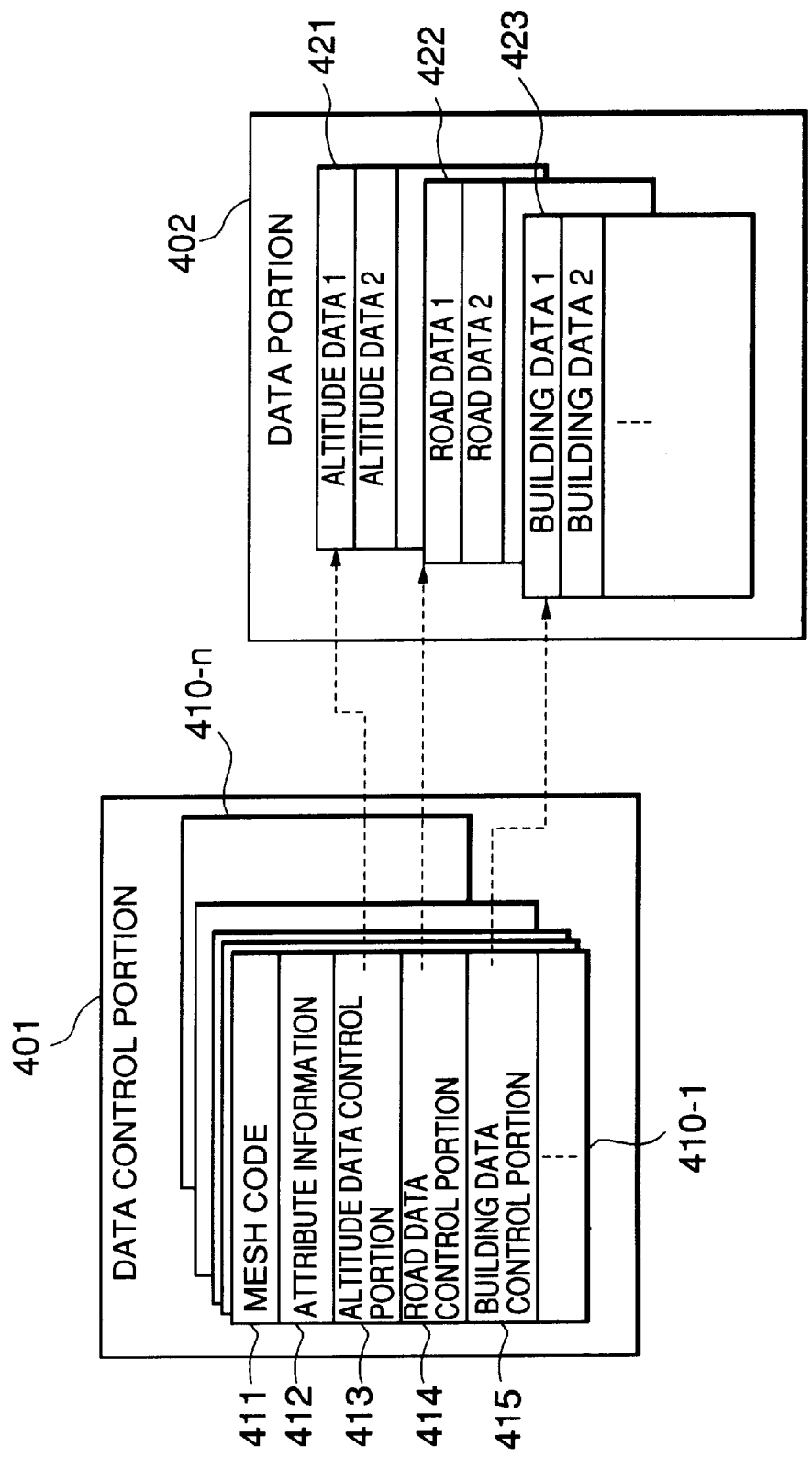
FIG. 4 is a diagram showing a data constitution of a map data base according to the first embodiment of the present invention.

FIG. 4 is a diagram showing data constitution of map data stored in the map data base 14.

As shown by FIG. 4, the map data is constituted by a data control portion 401 and a data portion 402. In this case, a map is expressed as an aggregation of standard area meshes partitioned by longitudinal lines and latitudinal lines at constant intervals.

The data control portion 401 is provided with control tables 410-1 through 410-n in correspondence with the respective standard area meshes. Each of the control tables includes a mesh code 411, attribute information 412, an altitude data control portion 413, a road data control portion 414 and a building data control portion 415.

The mesh code 411 is an identification number uniquely determined for each of the standard area meshes. The attribute information 412 includes a map scale, creation year, month and day of map data, a title of a drawing sheet and so on. The altitude data control portion 413 is constituted by data specifying link destination of altitude data, mentioned below. The road data control portion 414 and the building data control portion 415 are constituted respectively by data specifying link destinations of road data and building data, mentioned below.

The data portion 402 is constituted by a group of altitude data 421 for indicating respective values of altitudes of the standard area meshes, a group of road data 422 indicating links connecting nodes in correspondence with intersections and the like and a group of building data 423 indicating buildings.

The respective altitude data constituting the group of altitude data 421 include data indicating values of altitudes at positions sampled at equal intervals with respect to the standard area meshes in correspondence therewith. Accordingly, land forms of the standard area meshes can be specified based on the data indicating the values of the altitudes.

The respective road data constituting the group of road data 422 are constituted by links connecting nodes, coordinates of nodes, attributes of roads such as toll roads, national roads, prefectural roads and so on, and data indicating heights (offset values) of roads from the ground surface and the like.

The respective building data constituting the group of building data 423 are constituted by data indicating titles, shapes, heights and so on of buildings.

Any of the altitude data, the road data and the building data included in the group of altitude data 421, the group of road data 422 and the group of building data 423, are specified respectively by link information included in the altitude data control portion 413, the road data control portion 414 and the building data control portion 415. Thereby, the altitude data and the like in one of the standard area meshes is specified.

Figure 5:
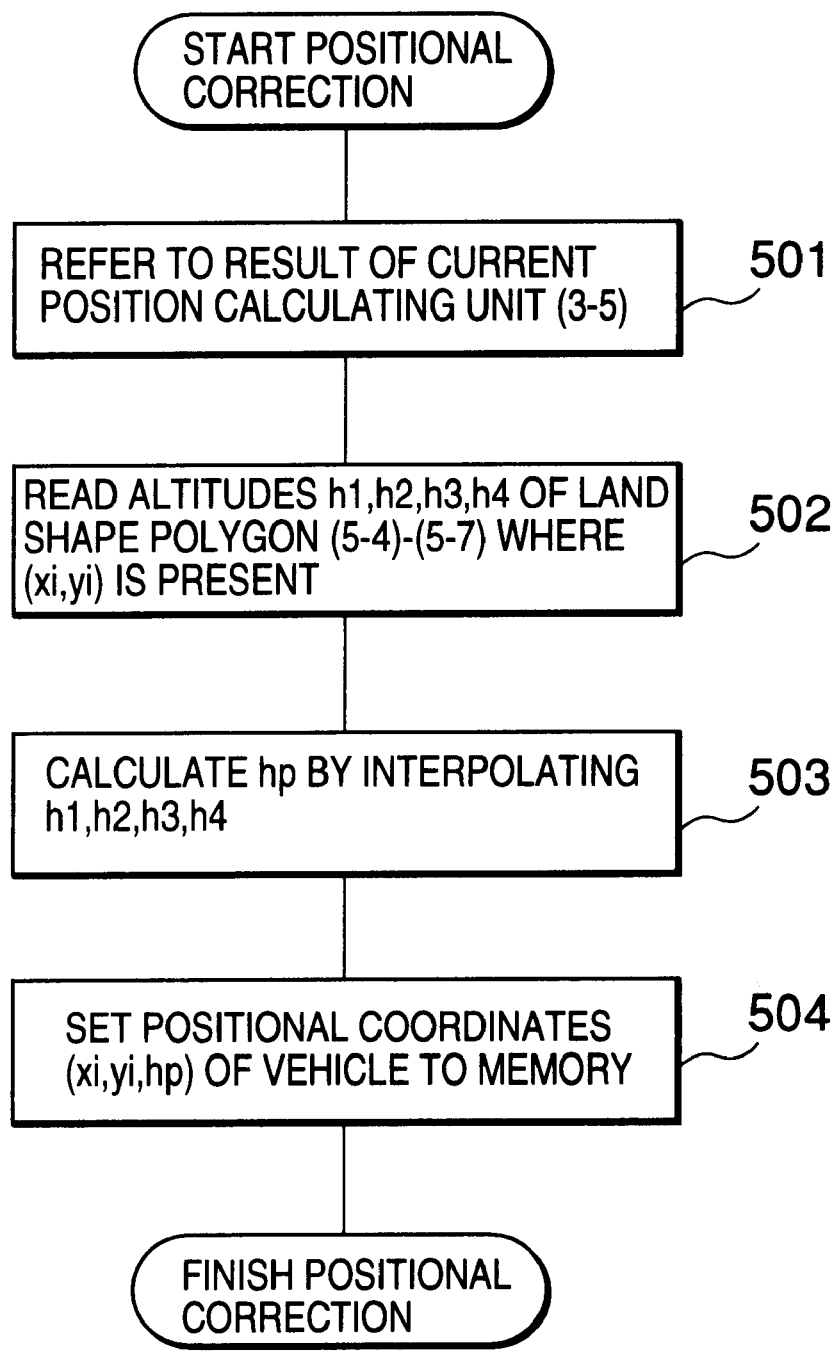
FIG. 5 is a flowchart showing processing executed by a position correcting unit according to the first embodiment of the present invention.

Now, an explanation will be given of the processing executed by the position correcting unit 52 in reference to FIG. 5 and FIG. 6. FIG. 5 is a flowchart showing the processing executed by the position correcting unit 52 and FIG. 6 is a diagram for explaining the processing of FIG. 5.

Figure 6:
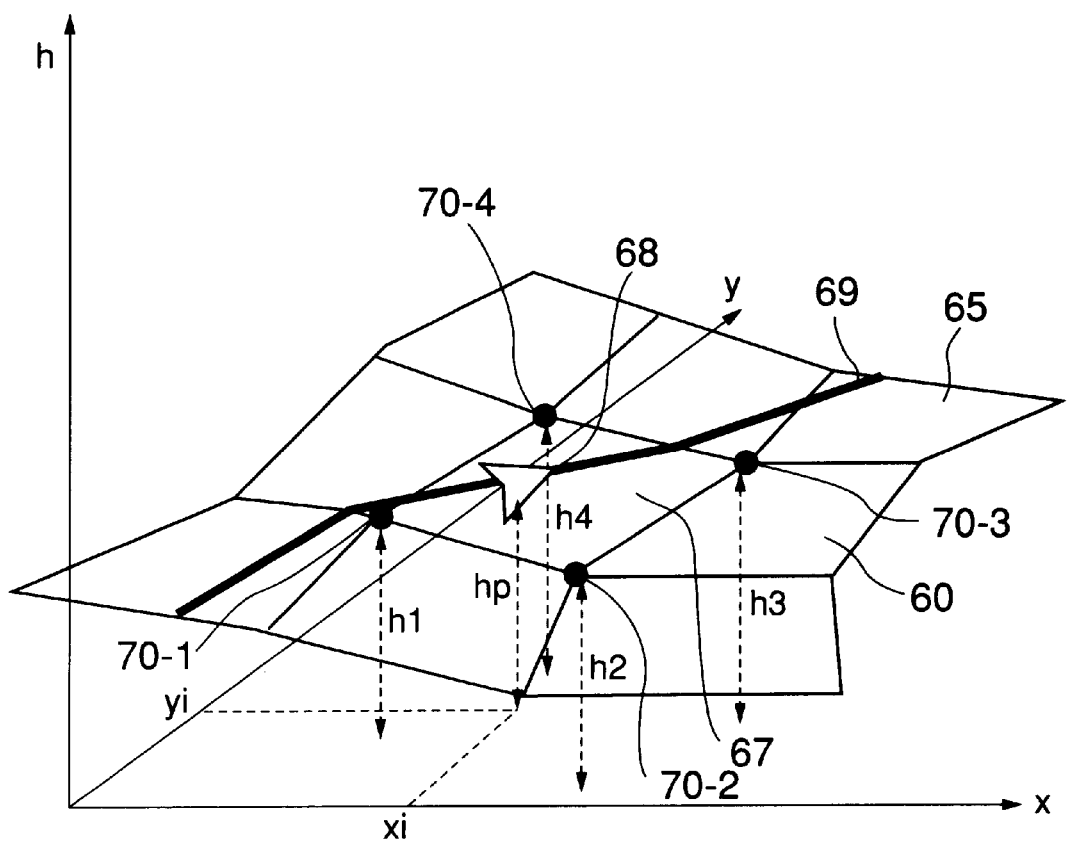
FIG. 6 is a diagram for explaining the processing of FIG. 5.

As mentioned above, according to the embodiment, a three-dimensional map shown by FIG. 6 is formed by using a three-dimensional coordinates system having a longitudinal direction of x, a latitudinal direction of y and a height direction of z.

In FIG. 6, reference numerals 60, 65 and so on (hereinafter, referred to as "ground surface") correspond to the standard area meshes explained in reference to FIG. 4. Further, notations 70-1 through 70-4 designate unit polygons constituting a ground surface 67 which correspond to vertices of a polygonal face (ground surface) where a vehicle position (xi, yi, hp) 68 is present. Further, reference numeral 69 designates a road in FIG. 6. These are obtained from various data stored in the map data base 14 shown by FIG. 4.

In FIG. 5, first, when the current position of the vehicle is updated, the position correcting unit 52 obtains the current position of the vehicle provided by the current position calculating unit 51 and obtains map data in the vicinity of the current position via the data reading unit 53. Further, the position correcting unit 52 calculates (corrects) the two-dimensional current position (xi, yi) of the vehicle based on the obtained data such that the current position of the vehicle is matched to a road having the highest correlation between the traveling locus of the vehicle and the shape of the road (step 501).

Next, the position correcting unit 52 obtains heights h1 through h4 of the vertexes 70-1 through 70-4 of the polygonal face where the current position (xi, yi) is present (refer to FIG. 6) from the map data base 14 via the data reading unit 53 (step 502).

Thereafter, the position correcting unit 52 calculates the height hp of the vehicle by interpolating the heights h1 through h4 (step 503) and temporarily stores the obtained three-dimensional coordinates (xi, yi, hp) indicating the current position of the vehicle (step 504). This operation is actually realized by storing them in a predetermined region of RAM 41 (refer to FIG. 2).

Figure 7:
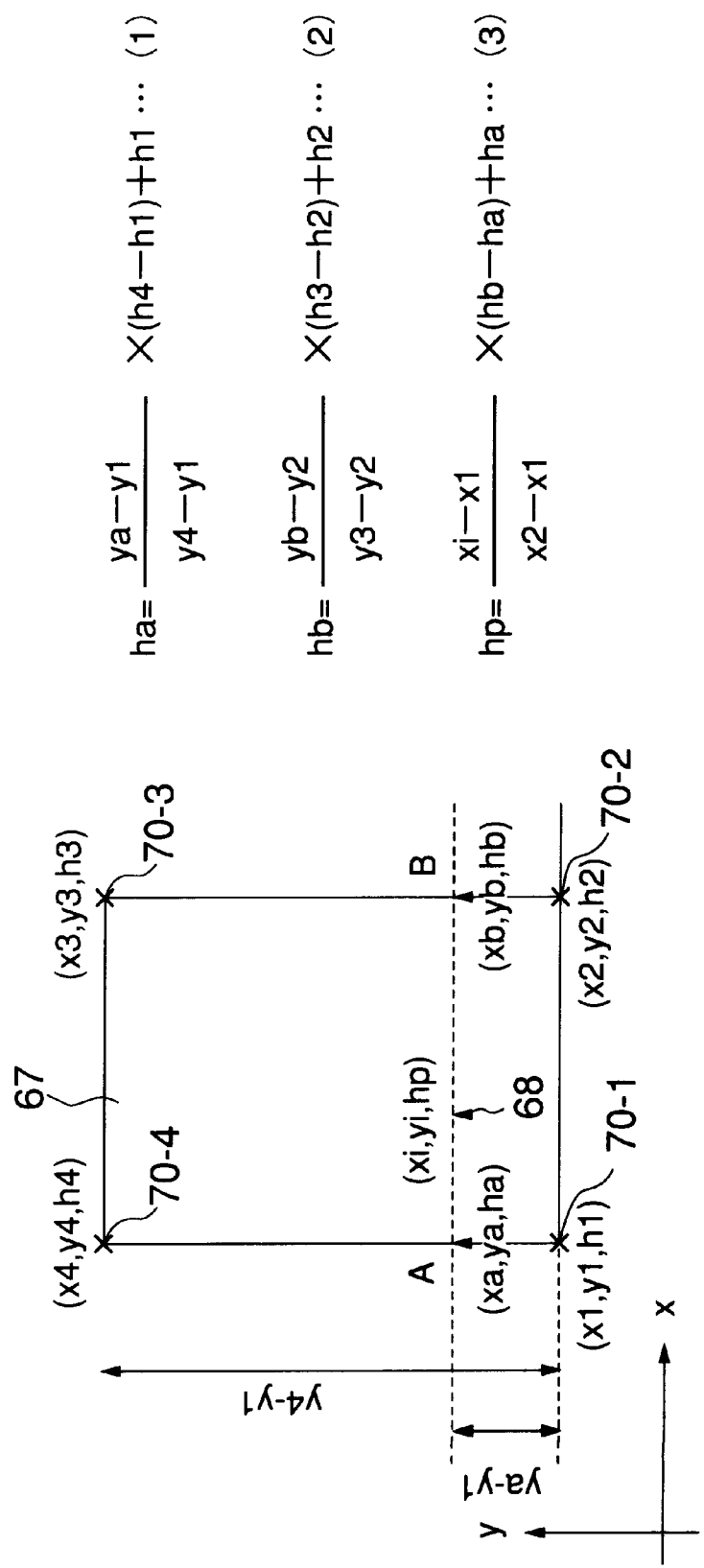
FIG. 7 is a diagram for explaining calculation of an altitude by the position correcting unit according to the first embodiment of the present invention.

Here, a simple explanation will be given of an example of a method of calculating the height hp of the vehicle according to the embodiment. According to the embodiment, for example, the altitude hp can be obtained by using a method of linear interpolation. FIG. 7 is a diagram for explaining calculation of the height hp in correspondence with the substantially planar view of the polygonal face (ground surface) 67 of FIG. 6.

First, a value (altitude) ha in z direction at intersection A of a straight line in parallel with a straight line connecting the vertexes 70-1 and 70-2 and passing through the current position 68 of the vehicle and a straight line connecting the vertexes 70-1 and 70-4, is calculated by the following equation (1).

$$ha=(ya-y1)/(y4-y1)\cdot(h4-h1)+h1 \quad (1)$$

Next, a value (altitude) hb in the z direction at intersection B between the parallel straight line mentioned above and a straight line connecting the vertexes 70-2 and 70-3, is calculated by the following equation (2).

$$hb=(yb-y2)/(y3-y2)\cdot(h3-h2)+h2 \quad (2)$$

Finally, the altitude hp of the current position 68 of the vehicle is calculated by the following equation (3) by using the obtained values of ha and hb.

$$hp=(xi-x1)/(x2-x1)\cdot(hb-ha)+ha \quad (3)$$

When the calculation of the current position of the vehicle has been completed, the obtained current position data is stored in the locus storing unit 54. The current position data is provided to the display processing unit 61. The display processing unit 61 forms a picture image superposed with an arrow mark indicating the current position of the vehicle on the map (three-dimensional map) which is read via the data reading unit 53 and which is constituted by map data of a region specified by the observing point and the angle of field of view set by the observing point setting unit 60. Thereby, the arrow mark indicating the current position of the vehicle can be overlappingly displayed in the three-dimensional display map on the screen of the display 12.

According to the embodiment, the value (altitude) in the z direction of the current position of the vehicle is calculated from predetermined coordinates of the polygonal face (ground surface) where the current position of the vehicle is present and accordingly, even in the case where position measuring accuracy in the height direction is low, the mark indicating the vehicle can be displayed with no departure from maps or roads on the screen.

An explanation has been given of the first embodiment of the present invention.

Next, an explanation will be given of a second embodiment of the present invention.

According to the embodiment, the constitution of the navigation device 10 is similar to that shown by FIG. 1 through FIG. 3 except for the processing executed by the position correcting unit 52 (refer to FIG. 3). Hence, an explanation will be given here only with respect to the processing of the position correcting unit 52 and an explanation of other parts will be omitted.

Figure 8:
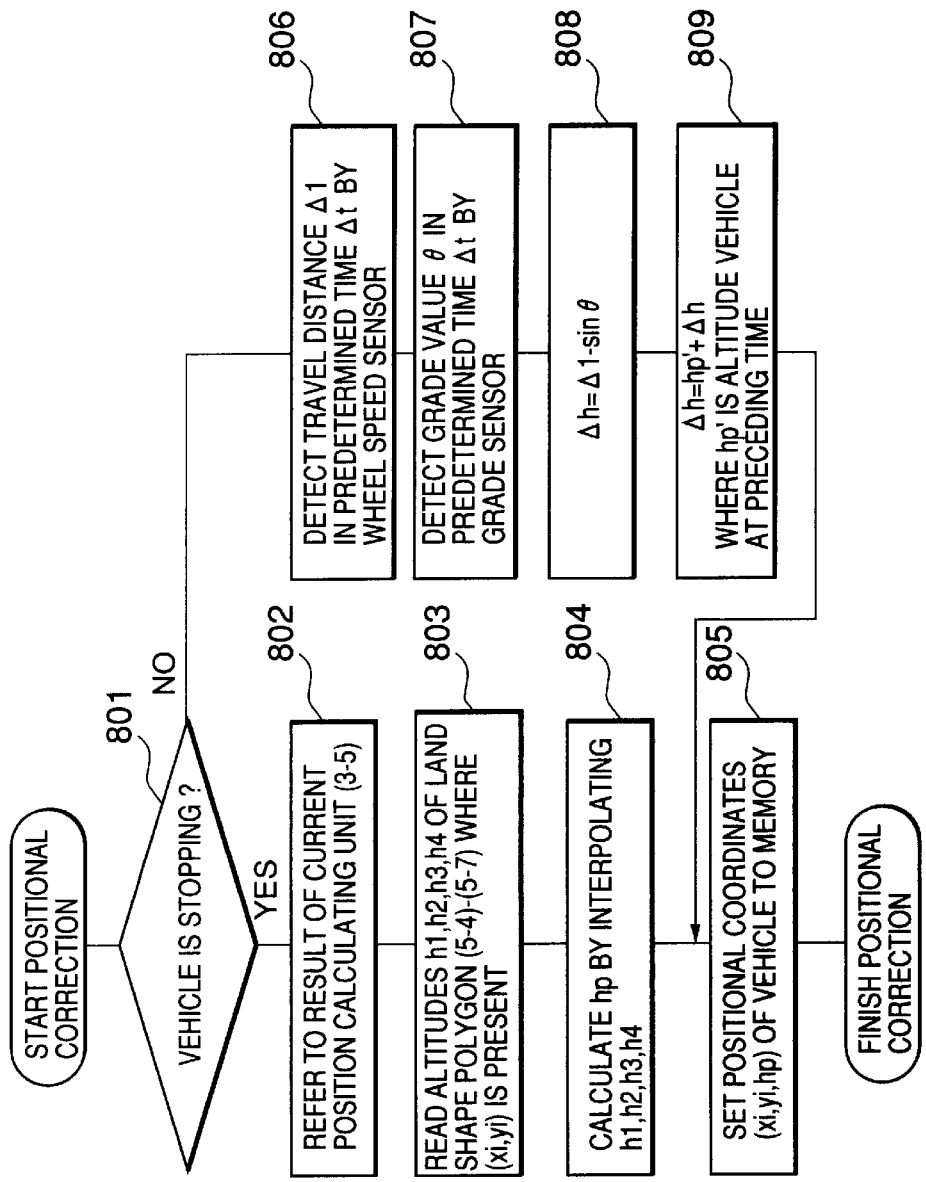
FIG. 8 is a flowchart showing processing executed by a position correcting unit according to a second embodiment of the present invention.
Figure 9:
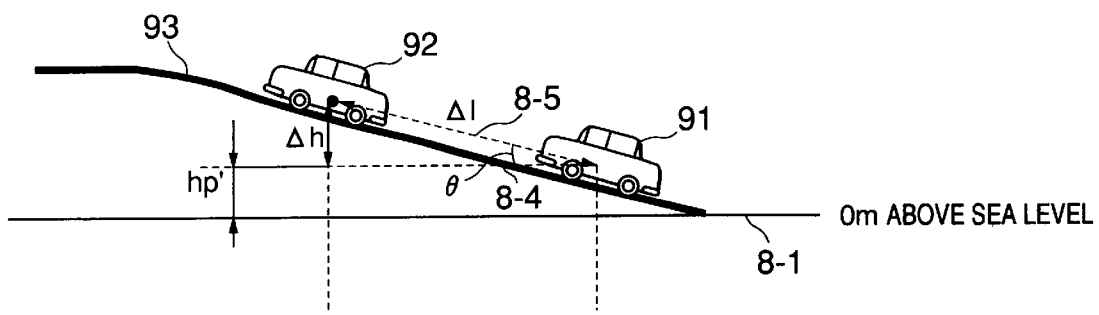
FIG. 9 is a diagram for explaining detection of height using a grade sensor.

FIG. 8 is a flowchart showing processing executed by the position correcting unit 52 according to the second embodiment of the present invention and FIG. 9 is a view for explaining height detection using a grade sensor.

As shown by FIG. 8, the position correcting unit 52 firstly determines whether the vehicle is stopping (step 801). This determination can be carried out based on the sensor value of the wheel speed sensor 20 provided in the current position calculating unit 51. When the determination is yes (Y) in step 801, processing of steps 802 through 805 is carried out. The processing of the steps 802 through 805 correspond respectively to the processing at steps 501 through 504 shown by FIG. 5 and accordingly, an explanation thereof will be omitted.

Meanwhile, when the determination is no (N) in step 801, the operation detects a travel distance Δl during a predetermined time period Δt based on the sensor value of the wheel speed sensor 20 provided to the current position calculating unit 51 (step 806). Next, the operation detects a grade θ based on the sensor value of the grade sensor 26 provided to the current position calculating unit 51 (step 807). The grade θ may be a difference between the grade value at a predetermined time t and the grade value at time t+Δt after elapse of a predetermined time period Δt. Alternately, it may be the grade value at a certain time during the predetermined time period Δt.

Thereafter, the operation calculates a change in the height Δh=Δl·sin θ by using the travel distance Δl and the grade θ (step 808). Next, the operation provides the current altitude hp of the vehicle by adding Δh to an altitude (designated by hp') which has been calculated at a preceding time (step 809). In FIG. 9, the altitude of a vehicle 91 is the altitude hp' which has been calculated at a preceding time. The altitude of a vehicle 92 after elapse of the predetermined time period Δt is changed from the altitude of the vehicle 91 by Δh. Accordingly, the altitude hp of the vehicle 91 is calculated by hp=hp'+Δh.

After calculating the altitude hp of the vehicle, the operation proceeds to step 805 and the coordinates (xi, yi, hp) of the current position of the vehicle is stored in the locus storing unit 54.

According to the embodiment, when the vehicle travels, by using the sensor value of the grade sensor, the change in the altitude of the vehicle is calculated by comparatively simple calculation, the altitude of the current position of the vehicle is calculated based thereon and accordingly, high speed formation of the processing can be achieved. Meanwhile, when the vehicle is stopping, the interpolation calculation where the coordinates of the vehicle are positioned on the polygonal face (ground surface) in the map is executed by which the error of the grade sensor can be canceled.

An explanation has been given of the second embodiment of the present invention.

Next, an explanation will be given of a third embodiment of the present invention.

The embodiment includes processing for calculating the altitude of a vehicle more accurately when a road is not constituted along a land form.

Further, according to the embodiment, the constitution of the navigation device 10 is similar to that shown by FIG. 1 through FIG. 3 except that processing executed by the position correcting unit 52 (refer to FIG. 3) is similar to the second embodiment. Hence, in this embodiment, an explanation will be given only for the processing of the position correcting unit 52 and an explanation of the other parts will be omitted.

Figure 11:
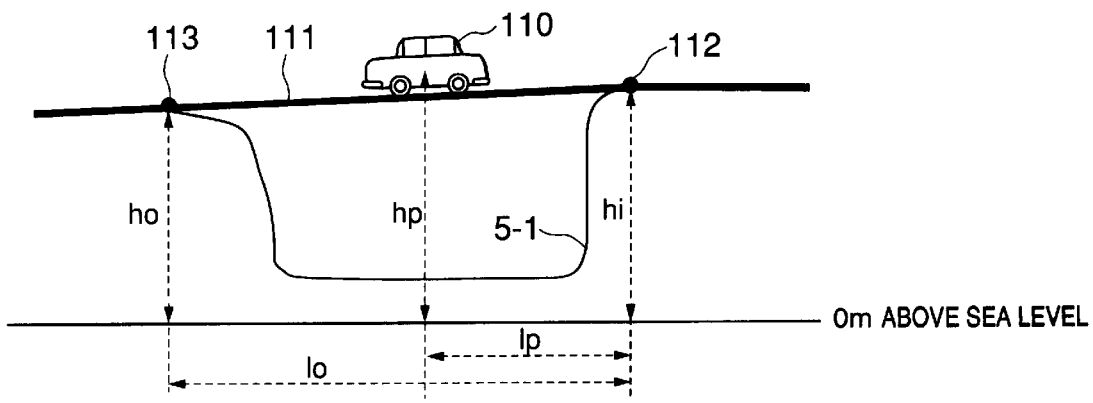
FIG. 11 is a view for explaining the processing of FIG. 10.

FIG. 10 is a flowchart showing the processing executed at the position correcting unit 52 according to the third embodiment of the present invention and FIG. 11 is a view for explaining the processing of FIG. 10.

In FIG. 10, firstly, the position correcting unit 52 obtains the current position of the vehicle and map data at the surrounding of the current position and calculates a road having the highest correlation between the traveling locus of the vehicle and the shape of a road based on the data similar to step 501 in FIG. 5. Further, the position correcting unit 52 calculates (corrects) the two-dimensional current position (xi, yi) of the vehicle such that the current position of the vehicle is matched to the calculated road (step 1001).

Next, the operation determines whether the road (node) matched to the current position of the vehicle is disposed on a bridge or in a tunnel (step 1002). When the determination is no (N) in step 1002, the operation executes processing (steps 1003 through 1005) which correspond to steps 502 through 504 in FIG. 5.

Meanwhile, when the determination is yes (Y) in step 1002, the operation obtains an altitude hi at an inlet of the bridge or the tunnel and an altitude ho at an outlet thereof referring to the road data (step 1006). For example, referring to FIG. 11, when a vehicle 110 is running on a bridge 111, the operation obtains an altitude hi of an inlet 112 of the bridge 111 and an altitude ho of an outlet 113 thereof.

Next, the operation calculates the altitude hp at the current position of the vehicle based on the altitude hi at the inlet and the altitude ho at the outlet, a two-dimensional distance lo from the inlet to the outlet and a two-dimensional travel distance lp from the inlet to the current position of the vehicle (step 1007).

Thereafter, the operation proceeds to step 1005 and stores the coordinates (xi, yi, hp) of the current position of the vehicle in the locus storing unit 54.

According to the embodiment, even when a vehicle travels on a road having an altitude different from an altitude of an actual land form, the altitude at the current position of the vehicle can be pertinently calculated.

An explanation has been given of the third embodiment of the present invention as described above.

Next, an explanation will be given of a fourth embodiment of the present invention.

The embodiment includes processing for calculating the altitude of the vehicle more accurately particularly when the vehicle travels on a road at a position offset from the ground surface such as an elevated line.

Further, according to the embodiment, the constitution of the navigation device 10 is similar to that shown in FIG. 1 through FIG. 3 except the processing executed at the position correcting unit 52 (refer to FIG. 3) similar to those in the second and the third embodiments. Hence, in this embodiment, an explanation will be given only of the processing of the position correcting unit 52 and an explanation of the other parts will be omitted.

Figure 12:
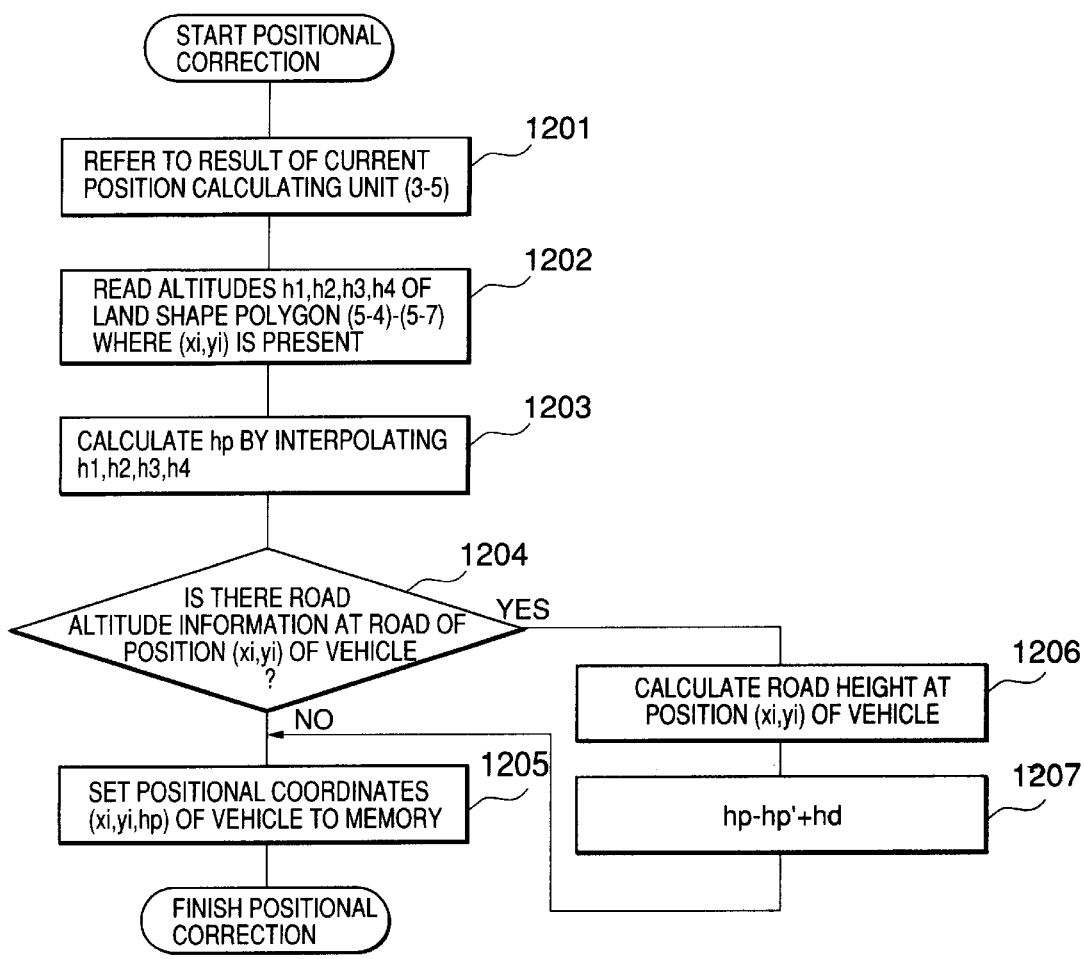
FIG. 12 is a flowchart showing processing executed by a position correcting unit according to a fourth embodiment of the present invention.

FIG. 12 is a flowchart showing processing executed at the position correcting unit 52 according to the fourth embodiment of the present invention.

In FIG. 12, firstly, the position correcting unit 52 executes processing similar to step 501 through step 503 in FIG. 5. That is, the operation obtains the current position of the vehicle and map data at the surrounding of the current position and calculates a road having the highest correlation between the traveling locus of the vehicle and the shape of a road. Further, the operation calculates (corrects) the two-dimensional current position (xi, yi) of the vehicle such that the current position of the vehicle is matched to the calculated road (step 1201).

Next, the operation calculates the altitude hp' of the vehicle by an interpolation calculation based on coordinates of the vertices of a polygonal face (ground surface) where the current position of the vehicle is present (steps 1202, 1203). Then, the operation obtains corresponding road data from the road controlling portion 414 with respect to standard area meshes in correspondence with the polygonal face (ground surface) where the current position of the vehicle is present and determines whether an altitude (offset value) from the ground surface of the road (node) where the current position of the vehicle is present is other than 0 (zero) (step 1204).

When the determination is no (N) in step 1204, that is, when the offset value is 0 (zero), the operation proceeds to step 1205 and executes processing similar to step 504 in FIG. 5. Meanwhile, when the determination is yes (Y) in step 1204, that is, when the offset value is other than 0 (zero), the operation causes the offset value in the map data to be a road height hd (step 1206) and calculates the altitude hp at the current position of the vehicle by adding the road height hd to the altitude hp' calculated at step 1203 (step 1207). Thereafter, the operation proceeds to step 1205 and stores the coordinates (xi, yi, hp) at the current position of the vehicle to the locus storing unit 54.

According to the embodiment, even when the vehicle travels on a road arranged to be offset from the ground surface as in an elevated line of a high speed road, the altitude at the current position of the vehicle can be calculated pertinently.

An explanation has been given of the fourth embodiment of the present invention as described above.

Next, an explanation will be given of a fifth embodiment of the present invention as follows.

According to the embodiment, a case where the map data base 14 does not store map data enabling three-dimensional map display as in the first through the fourth embodiments of the present invention described above, is assumed.

Further, according to the embodiment, the constitution of the navigation device 10 is similar to that shown by FIG. 1 through FIG. 3 except that there is a case where the data style of map data is different and except for processing at the position correcting unit 52. Hence, in this embodiment, an explanation will be given only of the processing of the position correcting unit 52 and an explanation of the other parts will be omitted.

Figure 13:
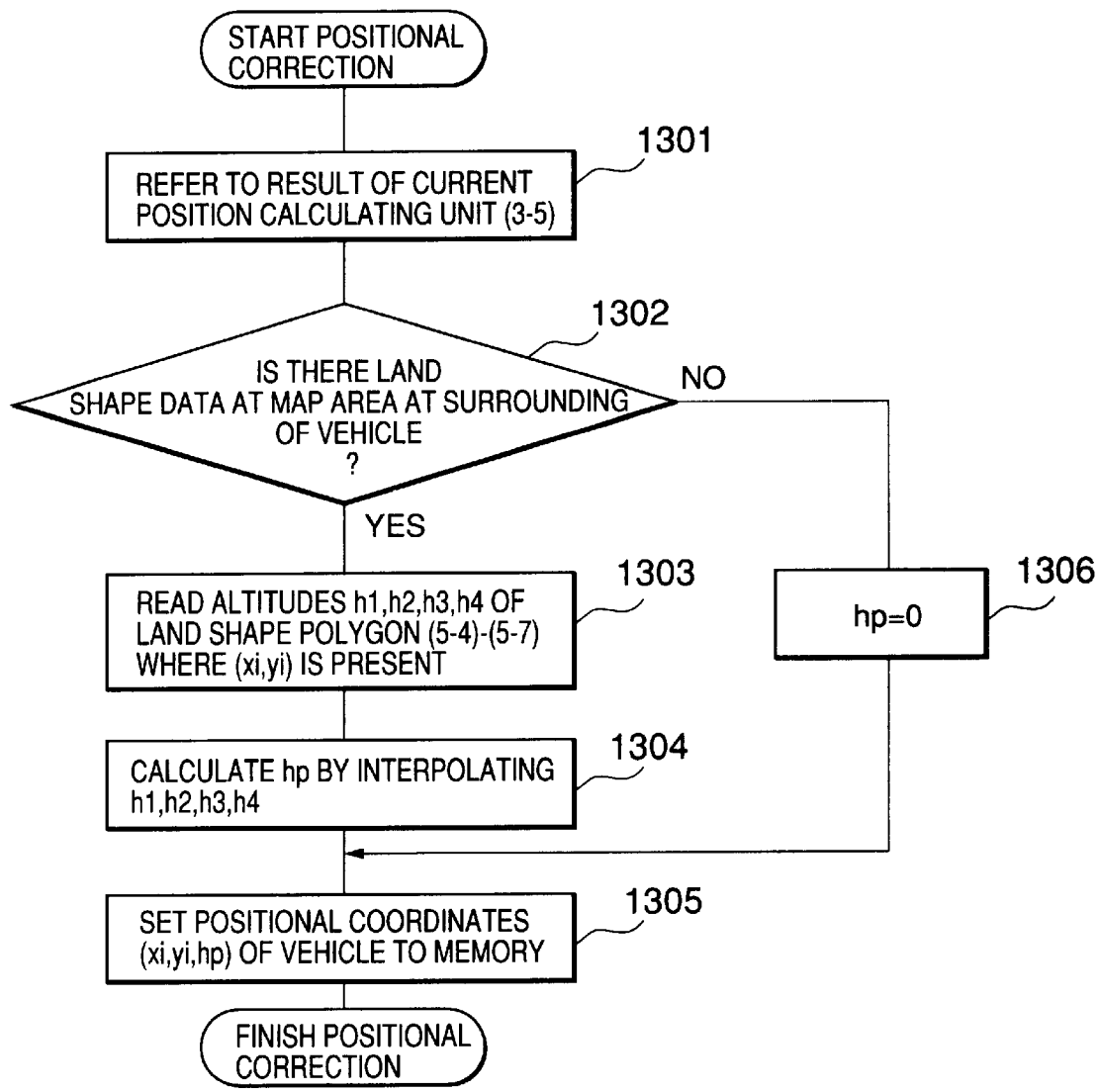
FIG. 13 is a flowchart showing processing executed by a position correcting unit according to a fifth embodiment of the present invention.

FIG. 13 is a flowchart showing the processing executed at the position correcting unit 52 according to the fifth embodiment of the present invention.

In FIG. 13, firstly, the position correcting unit 52 obtains the current position of the vehicle and map data at the surrounding of the current position and calculates a road having the highest correlation between the traveling locus of the vehicle and the shape of a road based on the data. Further, the operation calculates (corrects) the two-dimensional current position (xi, yi) of the vehicle such that the current position of the vehicle is matched to the calculated road (step 1301).

Next, the position correcting unit 53 determines whether data indicating the altitude is included in the map data by referring to the map data (step 1302). When the determination is yes (Y) in step 1302, processing similar to steps 502 through 504 in FIG. 5 is executed (steps 1303 through 1305).

Further, with respect to step 1302 mentioned above, a determination may be performed on whether the altitude data is present in the data portion (designated by notation 402 in FIG. 4) in correspondence with a mesh including the current position of the vehicle.

Meanwhile, when the determination is no (N) in step 1302, the operation makes the height hp of the current position of the vehicle to be 0 (zero) (step 1306) and thereafter, the operation proceeds to step 1305. That is, coordinates (xi, yi, hp=0) are stored to the locus storing unit 54.

When the data style of the map data does not necessarily include the altitude as mentioned above, the processing at the display processing unit 61 for displaying picture image on the screen of the display 12 is more or less different from those in the first through the fourth embodiments. In more detail, when the data style of the map data includes the altitude, processing similar to that in the first through the fourth embodiments is executed and when the data style of the map data does not include the altitude, a picture image superposing an arrow mark indicating the current position of the vehicle on the two-dimensional map is formed and displayed on the screen of the display 12.

Alternatively, a picture image based on the two-dimensional map may be displayed on the screen of the display 12 when the altitude data in correspondence with at least one area mesh among meshes to be displayed on the screen of the display 12 is not present.

Figure 14:
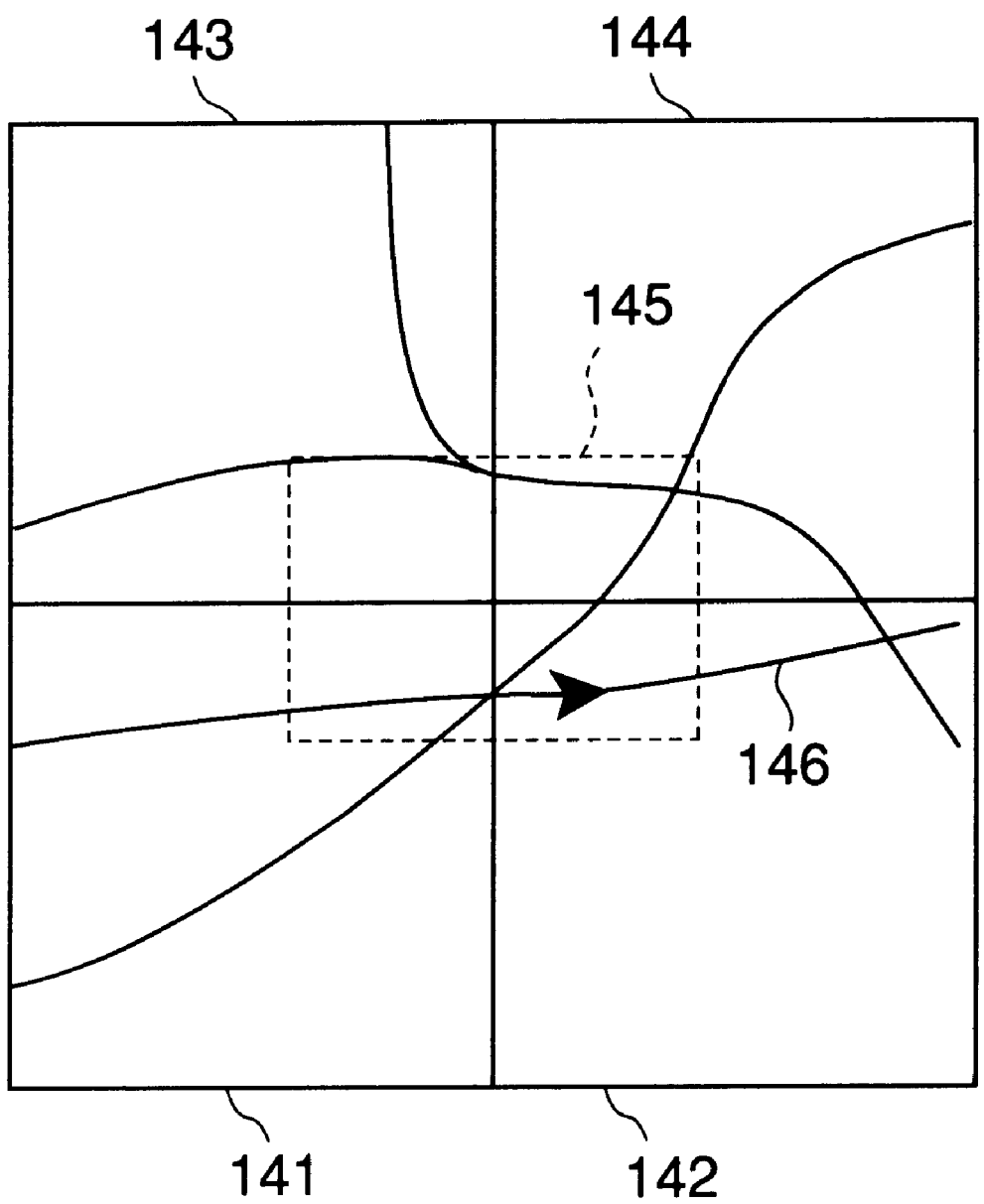
FIG. 14 is a diagram for explaining a case in which a region comprising a plurality of regional mesh portions is displayed on a display screen.

FIG. 14 is a diagram for explaining a case where a region 145 comprising meshes 141 through 144 are displayed on the screen of the display 12. In FIG. 14, the current position of the vehicle is disposed on a road 146 (refer to an arrow mark in FIG. 14). In that case, the display processing unit 61 checks on whether the altitude data in correspondence with the meshes 141 through 144 are present and when no altitude data in correspondence with any of the area meshes is present, the display processing unit 61 forms a picture image superposing an arrow mark where the vehicle is disposed on the two-dimensional map.

An explanation has been given of the fifth embodiment of the present invention as described above.

Next, an explanation will be given of a sixth embodiment of the present invention as follows.

According to the embodiment, a map can be displayed on the display 12 in any of three-dimensional display, quasi three-dimensional display and planar display (two-dimensional display) when an operator operates the input device 18.

Figure 15:
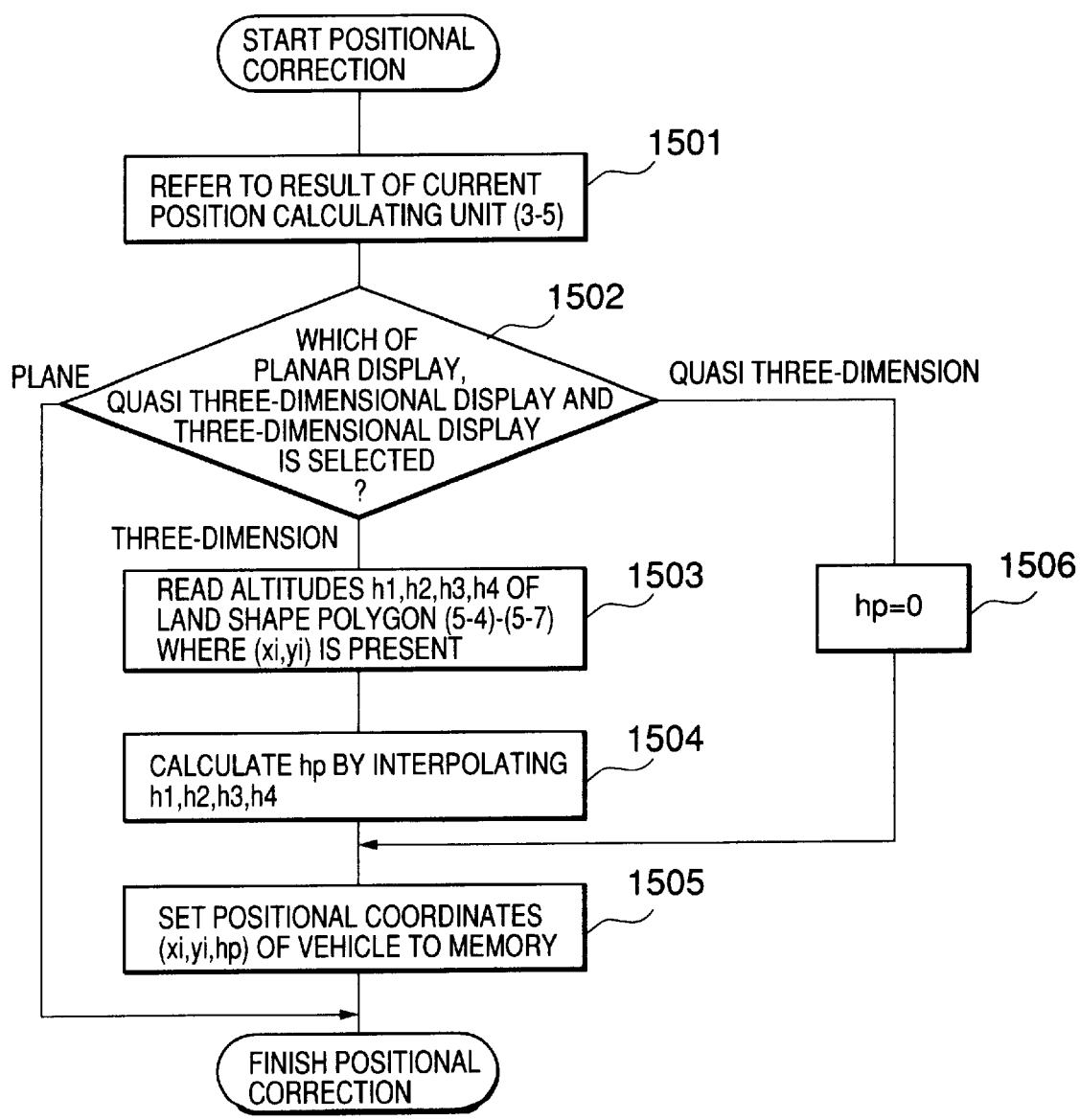
FIG. 15 is a flowchart showing processing of a position correcting unit according to a sixth embodiment of the present invention.

FIG. 15 is a flowchart showing the processing of the position correcting unit 52 according to the sixth embodiment of the present invention.

In FIG. 15, firstly, the position correcting unit 52 obtains the current position of the vehicle and map data in the vicinity of the current position and calculates a road having the highest correlation between the traveling locus of the vehicle and the shape of a road based on the data. Further, the operation calculates (corrects) the two-dimensional current position (xi, yi) of the vehicle such that the current position of the vehicle is matched to the calculated road (step 1501).

Next, the operation determines which of three-dimensional display, quasi three-dimensional display and planar display (two-dimensional display) is selected by referring to an instruction from the operator given to the command analyzing device 56 via the input device 18 (step 1502).

When the planar display is selected in step 1502, the processing is finished since the altitude is not needed in displaying to superpose the current position of the vehicle on a planar map.

Further, even in the case where the quasi three-dimensional display is selected in step 1502, the altitude is not needed in displaying to superpose the current position of the vehicle on a quasi three-dimensional map and accordingly, the operation sets the altitude hp of the vehicle to 0 (zero) (step 1506) and proceeds to step 1505. In this case, the coordinates (xi, yi, hp=0) of the current position of the vehicle is stored to the locus storing unit 54.

Meanwhile, when the three-dimensional display is selected in step 1502, processing similar to steps 502 through 504 in FIG. 5 are carried out (steps 1503 through 1505).

Further, when a map is displayed by the three-dimensional display or the quasi three-dimensional display, the display processing unit 61 obtains map data of an area specified by an observing point and an angle of field of view set by the observing point setting unit 60 via the data reading unit 53, forms a three-dimensional map or a quasi three-dimensional map based on such map data and forms a picture image superposing an arrow mark indicating the position of the vehicle on the formed map.

Thereby, the picture image including the three-dimensional map and the arrow mark indicating the current position of the vehicle, or the picture image including the quasi three-dimensional map provided by viewing the planar map from some observing point and the current position of the map can be displayed on the screen of the display 12.

Figure 16:
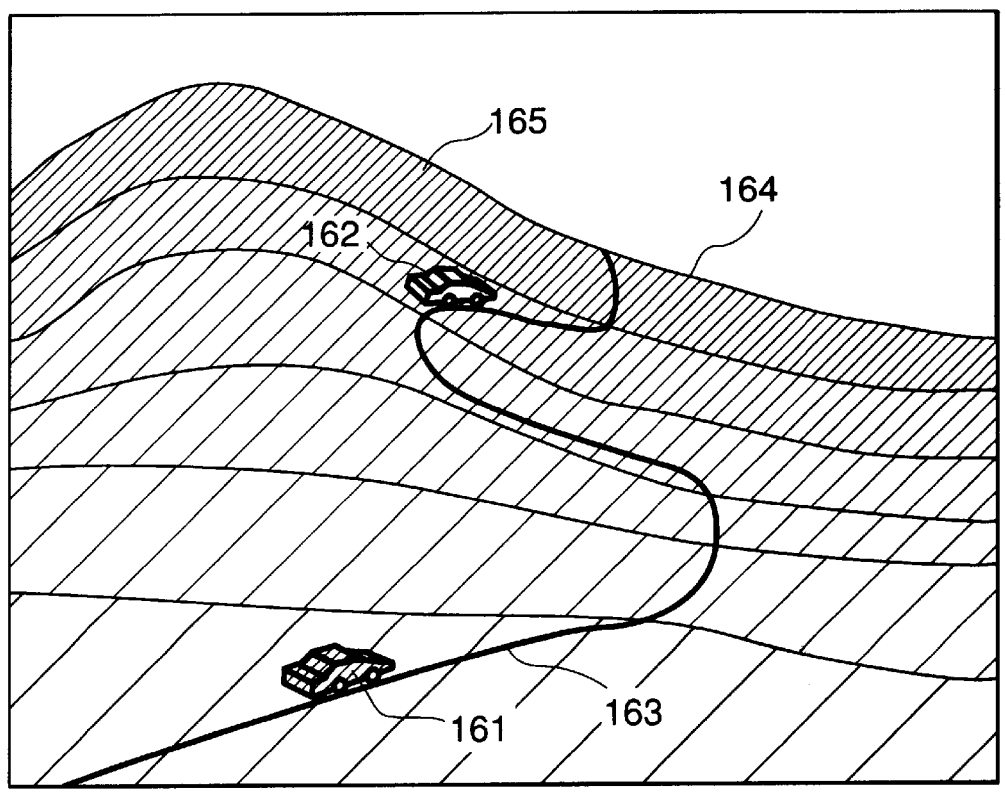
FIG. 16 is a view showing an example of a picture image including a map in a three-dimensional display and a mark indicating a current position of a vehicle.

FIG. 16 shows an example when a picture image including a three-dimensional map and a current position of a vehicle is displayed. In FIG. 16, a mark 161 indicating the current position of the vehicle is not an arrow mark but a symbol having the shape of an automobile. In this way, a driver can more easily grasp the position of the vehicle by positioning the mark 161 at a road in the map displayed stereoscopically.

Figure 17:
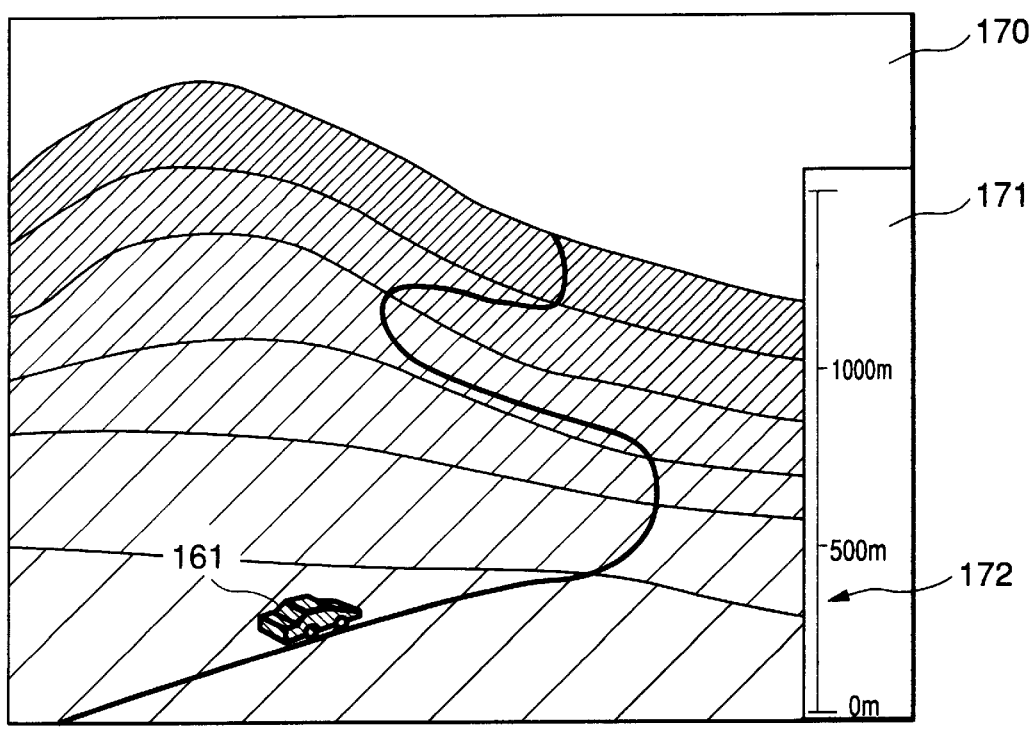
FIG. 17 is a view showing other example of a picture image including a map in a three-dimensional display and a mark indicating a current position of a vehicle.

Further, in FIG. 16, the color of the background changes with a change in the altitude (refer to notations 164 and 165). This is carried out by determining the color of polygonal faces (ground surfaces) by referring to the altitude data. According to the example, the higher the altitude, the darker the color is set. On the other hand, when the mark is disposed at a position with a higher altitude, it is constituted to be painted with a thinner color (refer to mark 161 and mark 162). In this way, by securing a contrast with a color of the background, the driver can recognize the mark more easily. Further, as shown by FIG. 17, it is further preferable to display a bar 171 indicating the altitude at a portion of a screen 170 and indicating the altitude at the current position of the vehicle by an arrow mark 172.

Meanwhile, when a map is displayed by two-dimensional display, a picture image may be formed by superposing an arrow mark indicating the position of a vehicle on a two-dimensional planar map as in the conventional case.

According to the embodiment, a map desired by an operator and a mark indicating the current position of a vehicle can be displayed on the screen of the display 12.

An explanation has been given of the sixth embodiment of the present invention as described above.

Further, the present invention is not limited to the above described respective embodiments but various modification can be performed within the scope of the gist of the present invention.

For example, although according to the respective embodiments described above, the position correcting unit 52 calculates a road having the highest correlation between the traveling locus of a vehicle and the shape of a road based on the current position of the vehicle provided by the current position calculating unit 51 and the map data and corrects the two-dimensional current position of the vehicle such that the current position of the vehicle is matched to the road, the present invention is not limited thereto. Such a correction need not be carried out when the position measuring accuracy by GPS is excellent and map matching is not needed or the like.

Further, the first embodiment may be combined with the third embodiment and/or the fourth embodiment, or the second embodiment may be combined with the third embodiment and/or the fourth embodiment.

In the former case, the processing of FIG. 5 by the position correcting unit 52 may be combined with the processing(s) of FIG. 10 and/or FIG. 12. Further, in the latter case, the processing of FIG. 8 may be combined with the processing(s) of FIG. 10 and/or FIG. 12. Further, the above-described combinations may be combined with the fifth embodiment or the sixth embodiment.

Further, although according to the third embodiment described above, the altitude hp of the vehicle is calculated based on the altitudes of the inlet and the outlet and the traveling distance from the inlet when a vehicle is disposed on a bridge or in a tunnel (refer to steps 1006 and 1007 in FIG. 10), the present invention is not limited thereto. For example, the altitude hi at the inlet of the bridge or the tunnel may be set to the altitude of the vehicle on the bridge or in the tunnel.

Further, in the fourth embodiment described above, when the altitude at the current position of the vehicle is calculated, the height (offset value) in the road data may not be utilized as it is (refer to steps 1206, 1207 in FIG. 12) but the altitude hp may be calculated by carrying out an interpolation calculation by utilizing the altitude at a start point of the road (link) and the altitude at an end point thereof and a distance from the start point to the position of the vehicle.

Further, although according to the respective embodiments described above, the navigation device carries out position measurement based on data from the various sensors and the GPS receiver, it is apparent that the position measurement can be carried out by using only any of the sensors and GPS.

Further, in this specification, means do not necessarily signify physical means but cases where functions of respective means are realized by software are included. Further, a single means or function of a member may be realized by two or more of physical means or members and two or more of means or functions of members may be realized by a single means or member.

As explained above, according to the embodiment, a stereoscopic map is displayed based on three-dimensional map information of a land form, road and the like and the current position of a vehicle can be displayed along a road stereoscopically drawn even when position measuring accuracy in the height direction is low.

What is claimed is:

1. A navigation device for displaying a current position of a mobile unit on a screen of a display device by superposing the current position on a map, said navigation device comprising:

position measuring means for measuring the current position of the mobile unit;

reading means for reading map data from a map data base where altitude data as a map constituent element is included;

mobile unit altitude determining means for determining an altitude of the mobile unit, by calculating an altitude at a position corresponding to a two-dimensional position of the mobile unit having been measured by said measuring means, based on said altitude data as a map constituent element; and displaying means for forming a perspective map based on the map data read by the reading means, provided by viewing from a direction at a predetermined angle with respect to a ground surface, determining a position for displaying the mobile unit three-dimensionally, according to the two-dimensional position and the altitude of the mobile unit have been calculated and displaying the current position of the mobile unit on the screen of the display device by superposing the current position on the perspective map.

2. The navigation device according to claim 1:

wherein the mobile unit altitude determining means executes map matching using the current position of the mobile unit measured by the position measuring means and road data read out from said map data base, and calculates an altitude corresponding to the two-dimensional position of the mobile unit obtained by the map matching, based on the altitude data as a map constituent element read out from said map data base.

3. The navigation device according to claim 1, further comprising:

a grade sensor for detecting an inclination of the mobile unit with respect to a horizontal face;

a traveling amount sensor for detecting a traveling amount of the mobile unit; and wherein the mobile unit altitude determining means determines an altitude at the current position of the mobile unit based on the altitude data read out from the map data base when the mobile unit is stationary, and determines an altitude of the current position of the mobile unit based on the traveling amount of the mobile unit in a vertical direction provided by the grade sensor and the traveling amount sensor when the mobile unit is traveling.

4. The navigation device according to claim 1:

wherein the map data comprises data of respective mesh areas partitioned in meshes by longitudinal lines and latitudinal lines; and wherein when a display area to be displayed on the screen of the display device includes a plurality of the mesh areas and the altitude data is not included in data of any one of the mesh areas, the mobile unit altitude determining means forms a two-dimensional (planar) map in place of the perspective map and displays a two-dimensional current position of the mobile unit by superposing the current position on the map.

5. The navigation device according to claim 1:

wherein the displaying means displays a map in accordance with any of a first mode for displaying a two-dimensional map by using only information with respect to longitudes and latitudes of the map data, a second mode for displaying a perspective map (quasi three-dimensional map) provided by viewing the two-dimensional map from a direction forming a predetermined angle with respect to the two-dimensional map and a third mode for displaying the perspective map (three-dimensional map) provided by viewing the three-dimensional ground surface specified by the longitudes, the latitudes and the altitude data of the map data from a direction forming a predetermined angle with respect to the ground surface; and wherein the mobile unit altitude determining means sets the altitude at the current position of the mobile unit as 0 meter above the sea level when the second mode is selected and determines an altitude of the mobile unit, by calculating an altitude at a position corresponding to a two-dimensional position of the mobile unit having been measured by said measuring means, based on said altitude data as a map constituent element when the third mode is selected.

6. The navigation device according to claim 1:

wherein the mobile unit altitude determining means determines the altitude at the current position of the mobile unit when a road where the current position of the mobile unit is disposed is not positioned along the ground surface, based on altitudes at a start point and an end point of a section of the road which is not disposed along the ground surface.

7. The navigation device according to claim 1:

wherein the mobile unit altitude determining means calculates the altitude at the current position of the mobile unit when the road where the current position of the mobile unit is disposed is not positioned along the ground surface, based on the altitudes at the start point and the end point and a traveling distance from the start point to the current position of the mobile unit.

8. The navigation device according to claim 1:

wherein the mobile unit altitude determining means sets the altitude at the current position of the mobile unit to either of the altitudes of the start point and the end point when the road where the current position of the mobile unit is disposed is not positioned along the ground surface.

9. The navigation device according to claim 1:

wherein the map data includes a road altitude data and a land form altitude data; and wherein the mobile unit altitude determining means calculates the altitude at the current position of the mobile unit based on the land form altitude data read out from said map data and the road altitude data at the position where the mobile unit exists.

10. The navigation device according to claim 1:

wherein the displaying means changes a mark indicating the mobile unit displayed on the screen of the displaying device in accordance with a change in the altitude at the current position of the mobile unit provided by the mobile unit altitude determining means.

11. The navigation device according to claim 1:

wherein the displaying means displays the altitude at the current position of the mobile unit provided by the mobile unit altitude determining means on the screen of the displaying device.

12. The navigation device according to claim 1, further comprising:

a displaying device for displaying a picture image formed by the displaying means.

* * * * *